(12) United States Patent
Azagarsamy et al.

(10) Patent No.: US 10,490,850 B2
(45) Date of Patent: Nov. 26, 2019

(54) POLY(KETONE)-BASED POLYMER ELECTROLYTES FOR HIGH VOLTAGE LITHIUM ION BATTERIES

(71) Applicants: Seeo, Inc., Hayward, CA (US); Robert Bosch GmbH, Stuttgart (DE)

(72) Inventors: Malar Azagarsamy, Fremont, CA (US); Kulandaivelu Sivanandan, Fremont, CA (US); Hany Basam Eitouni, Oakland, CA (US); Jonathan P. Mailoa, Cambridge, MA (US); Georgy Samsonidze, Boston, MA (US); Karim R. Gadelrab, Boston, MA (US); Boris Kozinsky, Waban, MA (US)

(73) Assignees: SEEO. INC, Hayward, CA (US); Robert Bosch GmbH, Stuttgart (DE)

( * ) Notice: Subject to any disclaimer, the term of this patent is extended or adjusted under 35 U.S.C. 154(b) by 153 days.

(21) Appl. No.: 15/847,621

(22) Filed: Dec. 19, 2017

(65) Prior Publication Data
US 2019/0190067 A1    Jun. 20, 2019

Related U.S. Application Data

(63) Continuation of application No. PCT/US2017/066887, filed on Dec. 16, 2017.

(51) Int. Cl.
| | |
|---|---|
| H01M 10/0565 | (2010.01) |
| H01M 10/0562 | (2010.01) |
| H01M 10/0525 | (2010.01) |
| H01M 4/505 | (2010.01) |
| H01M 4/525 | (2010.01) |
| H01M 4/58 | (2010.01) |
| H01M 4/36 | (2006.01) |
| H01M 4/02 | (2006.01) |

(52) U.S. Cl.
CPC ......... *H01M 10/0565* (2013.01); *H01M 4/36* (2013.01); *H01M 4/505* (2013.01); *H01M 4/525* (2013.01); *H01M 4/58* (2013.01); *H01M 10/0525* (2013.01); *H01M 10/0562* (2013.01); *H01M 2004/027* (2013.01); *H01M 2004/028* (2013.01); *H01M 2300/0065* (2013.01)

(58) Field of Classification Search
CPC ......... H01M 10/0525; H01M 10/0562; H01M 10/0565; H01M 2004/027; H01M 2004/028; H01M 2300/0065; H01M 4/36; H01M 4/505; H01M 4/525; H01M 4/58
See application file for complete search history.

(56) References Cited

U.S. PATENT DOCUMENTS

| | | |
|---|---|---|
| 6,987,154 B2 | 1/2006 | Choi et al. |
| 7,695,863 B2 | 4/2010 | Abe et al. |
| 2005/0075475 A1 | 4/2005 | Taniguchi et al. |

OTHER PUBLICATIONS

Lee, "Ionic conductivity in the poly(ethylene malonate) / lithium triflate system," Solid State Ionics 138 (2001) 273-276.
International Search Report for PCT/US2017/066887, dated Mar. 12, 2018.

*Primary Examiner* — Carlos Barcena
(74) *Attorney, Agent, or Firm* — Brooks Kushman P.C.

(57) ABSTRACT

New poly(ketone)-based polymers have been synthesized. When these polymers are combined with electrolyte salts, such polymer electrolytes have shown excellent electrochemical oxidation stability in lithium battery cells. Their stability along with their excellent ionic transport properties make them especially suitable as electrolytes in high energy density lithium battery cells.

20 Claims, 4 Drawing Sheets

POLY(KETONE)-BASED POLYMER ELECTROLYTES FOR HIGH VOLTAGE LITHIUM ION BATTERIES

CROSS-REFERENCE TO RELATED APPLICATIONS

This application is a continuation of International Patent Application PCT/US2017/066887, filed Dec. 16, 2017, which is incorporated by reference herein.

BACKGROUND OF THE INVENTION

Field of the Invention

This invention relates generally to electrolytes for lithium batteries, and, more specifically, to electrolytes that are especially suited for use in cathodes and at high voltages.

More and more lithium battery manufacturers are using next-generation cathode materials such as NCA (lithium nickel cobalt aluminum oxide), NCM (lithium nickel cobalt manganese oxide), and high energy NCM (HE-NCM-magnesium-rich lithium nickel cobalt manganese oxide) in order to exploit their potentially high gravimetric energy densities (as high as 300-500 Wh/kg), their good rate capabilities, and their long-term stability. Cells made with such oxidic cathode materials often operate at higher voltages (e.g., as high as 4.7V) than do cells (e.g., 3.6-3.8V) with olivine cathode materials such as LFP (lithium iron phosphate). Electrolytes that have been stable at the lower voltages of LFP cells may have difficulty operating at the higher voltages, especially in the cathode. Degradation, in the form of oxidation, may lead to capacity fade early in the life of a cell.

Thus, there is a need to develop electrolytes that are especially well-suited to operate in the high voltage conditions of next generation cathode materials.

SUMMARY

In one embodiment of the invention, a polymer is described. The polymer includes a ketone-based polymer structure described by:

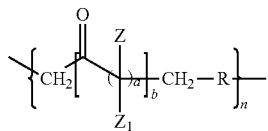

wherein a is an integer that ranges from 1 to 10; b is an integer that ranges from 1 to 10; and n is an integer that ranges from 1 to 1000. Each Z and $Z_1$ is selected independently from the group consisting of:

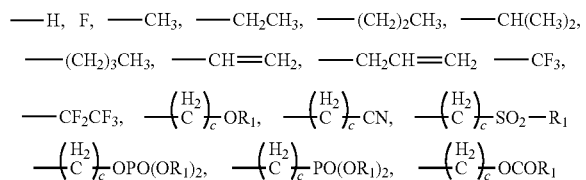

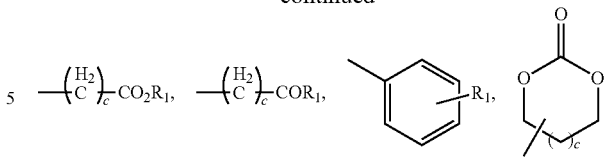

wherein c is an integer that ranges from 0 to 10; each $R_1$ is selected independently from the group consisting of hydrogen, methyl, ethyl, propyl, and isopropyl groups; and each R is selected independently from the group consisting of:

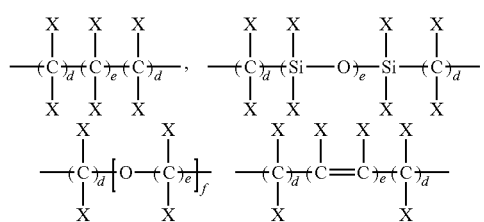

wherein d, e, and f are integers, and each integer ranges independently from 0 to 10; and each X is selected independently from the group consisting of hydrogen, fluorine, methyl, ethyl, isopropyl, and trifluoromethyl groups.

In some embodiments of the invention, any of the polymers described herein are combined with an electrolyte salt and can be used as a polymer electrolyte.

In some embodiments of the invention, any of the polymer electrolytes described herein further includes ceramic electrolyte particles.

In some arrangements, any of the polymers described herein is crosslinked and may or may not be combined with an electrolyte salt to be used as a polymer electrolyte.

In one embodiment of the invention, a positive electrode includes a positive electrode active material; and a catholyte comprising any of the electrolytes described herein. The positive electrode active material particles and the catholyte are mixed together. The catholyte may also include a solid polymer electrolyte. The catholyte may also include ceramic electrolyte particles. The catholyte may be crosslinked. The catholyte may contain an electrolyte salt that is a lithium salt.

The positive electrode active material may be any of lithium iron phosphate, lithium metal phosphate, divanadium pentoxide, lithium nickel cobalt aluminum oxide, lithium nickel cobalt manganese oxide, magnesium-rich lithium nickel cobalt manganese oxide, lithium manganese spinel, lithium nickel manganese spinel, and combinations thereof.

In another embodiment of the invention an electrochemical cell includes an anode configured to absorb and release lithium ions; a cathode comprising cathode active material particles, an electronically-conductive additive, and a first catholyte; a current collector adjacent to an outside surface of the cathode; and a separator region between the anode and the cathode, the separator region comprising a separator electrolyte configured to facilitate movement of lithium ions back and forth between the anode and the cathode. The first catholyte may include any of the electrolytes described herein. The first catholyte may also contain ceramic electrolyte particles. The first catholyte may be crosslinked. The electrolyte salt may be a lithium salt.

The first catholyte and/or the separator electrolyte may also contain a solid polymer electrolyte. In one arrangement, the first catholyte and the separator electrolyte are the same.

In one arrangement, there is an overcoat layer between the cathode and the separator region. The overcoat layer includes a second catholyte, which may be any of the electrolytes disclosed herein. The first catholyte and the second catholyte may or may not be the same.

The anode may contain any of lithium metal, lithium alloy, lithium titanate, graphite and silicon.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
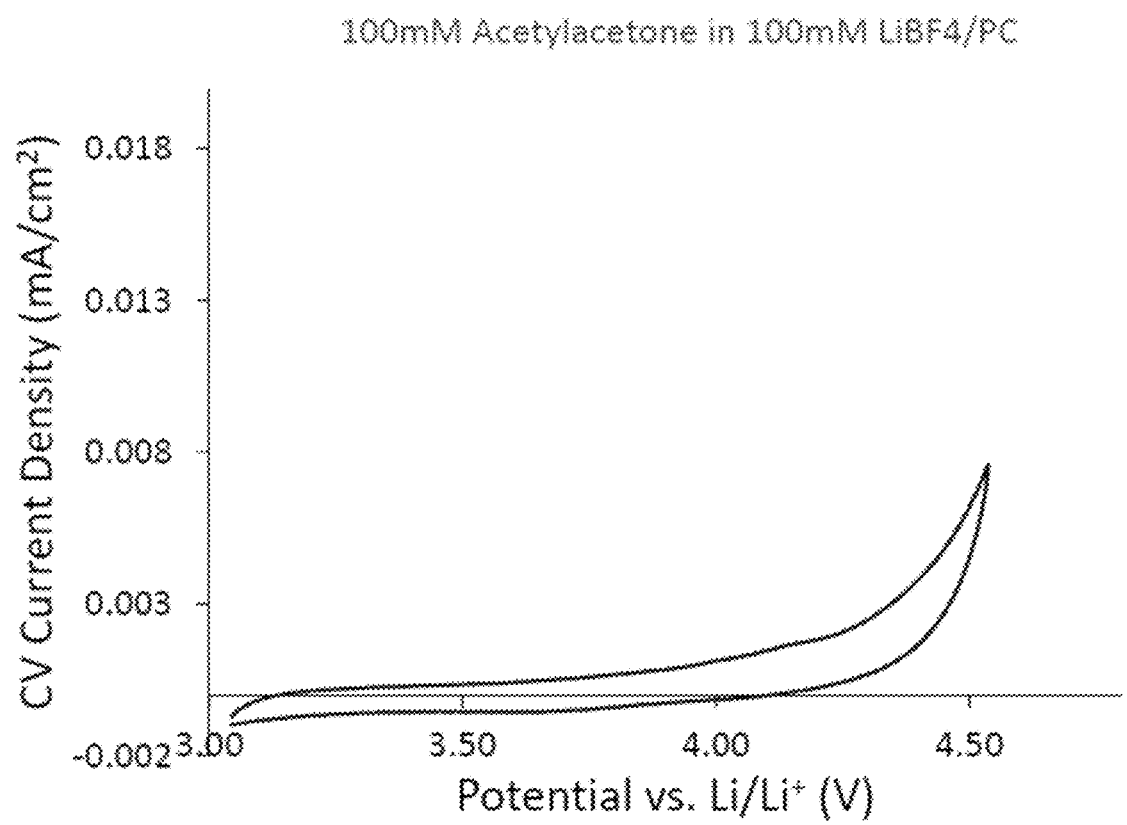
FIG. 1 is a graph that shows cyclic voltammetry data for a ketone repeat structure, according to an embodiment of the invention.

The embodiments of the invention are illustrated in the context of ketone polymers that can be used as electrolytes or electrolyte additives in lithium battery cells and the like. The skilled artisan will readily appreciate, however, that the materials and methods disclosed herein will have application in a number of other contexts where high-voltage electrolytes are desirable, particularly where long-term stability is important.

These and other objects and advantages of the present invention will become more fully apparent from the following description taken in conjunction with the accompanying drawings.

All publications referred to herein are incorporated by reference in their entirety for all purposes as if fully set forth herein.

In this disclosure, the terms "negative electrode" and "anode" are both used to describe a negative electrode. Likewise, the terms "positive electrode" and "cathode" are both used to describe a positive electrode.

It is to be understood that the terms "lithium metal" or "lithium foil," as used herein with respect to negative electrodes, describe both pure lithium metal and lithium-rich metal alloys as are known in the art. Examples of lithium rich metal alloys suitable for use as anodes include Li—Al, Li—Si, Li—Sn, Li—Hg, Li—Zn, Li—Pb, Li—C or any other Li-metal alloy suitable for use in lithium metal batteries. Other negative electrode materials that can be used in the embodiments of the invention include materials in which lithium can intercalate, such as graphite, and other materials that can absorb and release lithium ions, such as silicon, germanium, tin, and alloys thereof. Many embodiments described herein are directed to batteries with solid polymer electrolytes, which serve the functions of both electrolyte and separator. As it is well known in the art, batteries with liquid electrolytes use an inactive separator material that is distinct from the liquid electrolyte.

The following construction is used throughout this disclosure: "each variable is chosen independently" from a list that is provided. An example of this usage can be found with reference to X groups in some of the inventive polymer structures in which there are many Xs. The example is, "each X may be chosen independently from hydrogen, fluorine, methyl, ethyl, isopropyl, and trifluoromethyl groups." This construction is used to mean that for a particular X in the structure, any of the groups in the list may be used. In choosing a group to use for another X in the structure, any of the groups in the list may be used with no regard to the choices that have been made for other X groups. Thus, the following arrangements are all possible: all the Xs may be the same, all the Xs may be different, or some Xs may be the same and some may be different.

The molecular weights given herein are number-averaged molecular weights.

The term "solid polymer electrolyte" is used herein to mean a polymer electrolyte that is solid at battery cell operating temperatures. Examples of useful battery cell operating temperatures include room temperature (25° C.), 40° C., and 80° C.

In this disclosure, ranges of values are given for many variables. It should be understood that the possible values for any variable also include any range subsumed within the given range.

Based on repeated observation of $Li^+$ interaction with other atoms in molecular dynamics (MD) simulations, it seems that $Li^+$ coordinates with partially-negatively-charged atoms in a polymer electrolyte or, when the Li-salt is not soluble in the polymer, with negatively charged anions of the salt that has been added to a polymer to form the electrolyte. With polyethylene oxide (PEO), $Li^+$ coordinates with partially-negatively-charged oxygen atoms in the PEO. Similarly, in poly(ketone)s, $Li^+$ coordinates with partially-negatively charged oxygens in the carbonyl groups.

Poly(ketone):

In some embodiments of the invention, the general structure of a ketone-based polymer is shown below. The ketone-based polymer has functional side chains Z and $Z_1$ that can be attached either directly as shown or through extendable alkyl chains (not shown).

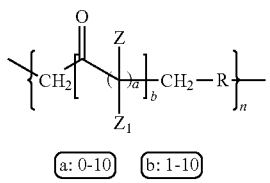

Each Z, $Z_1$, and R is chosen independently from the lists below; a is an integer that ranges from 0 to 10; b is an integer that ranges from 1 to 10; and n is an integer that ranges from 1 to 1000.

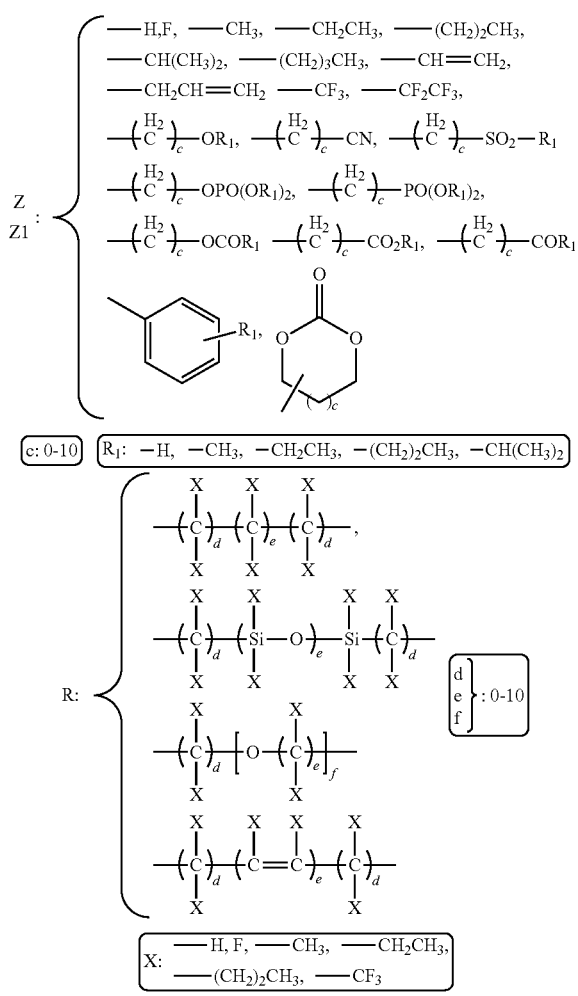

For Z and $Z_1$, c is an integer that ranges from 0 to 10, and $R_1$ may be hydrogen, methyl, ethyl, propyl or isopropyl.

For R, d, e and f is each an integer that ranges independently from 0 to 10, and each X may be chosen independently from hydrogen, fluorine, methyl, ethyl, isopropyl, and trifluoromethyl.

In another embodiment of the invention, particles of ceramic electrolyte are mixed into a poly(ketone)-based polymer electrolyte to form an enhanced composite electrolyte with superior ionic transport and mechanical properties.

Such a composite electrolyte may be used in a lithium battery cell in the separator region or in the cathode. Examples of ceramic electrolytes that are useful for mixing with poly(ketone)-based polymer electrolytes include, but are not limited to, those shown in Table 1 below.

TABLE 1

Exemplary Ceramic Conductors for Use as Additives in Poly(ketone)-Based Polymer Electrolytes

| Electrolyte Type | Exemplary Formulas | Mixture Proportion |
|---|---|---|
| Oxynitride glass | $Li_xPO_yN_z$ x = 2.9, y = 3.3, z = 0.46  0.24 < z < 1.2 $Li_xBO_yN_z$ | |
| Sulfide and oxysulfide glass | $Li_2S \bullet P_2S_5$ | 0.75:0.25 |
| | $Li_2S \bullet SiS_2$ | 0.6:0.4 |
| | $Li_2S \bullet SiS_2 \bullet Li_xMO_4$ M = Si, P, Ge | 0.57:0.38:0.05 |
| | $Li_2S \bullet SiS_2 \bullet Li_3PO_4$ | 0.63:0.36:0.01 |
| | $Li_2S \bullet SiS_2 \bullet xMS_y$ M = Sn, Ta, Ti | 0.6:0.4:0.01-0.05 |
| | $Li_2S \bullet SiS_2 \bullet Li_3N$ | 0.55:0.40:0.03 |
| Li thionitride glass | $Li_3N \bullet SiS_2$ | 0.4:0.6 |
| LLTO | $La_{2/3-x}Li_{3x}TiO_3$ $0.03 \leq x \leq 0.167$ | |
| Perovskite structure (Ohara type) | $La_{1/3-x}Li_{3x}TaO_3$ $0.025 \leq x \leq 0.167$ $La_{1/3-x}Li_{3x}NbO_3$ $0 \leq x \leq 0.06$ | |
| Nasicon-type (Lisicon) phosphate | $Li_{1.3}Ti_{1.7}Al_{0.3}(PO_4)_3$ $LiAlTa(PO_4)_3$ $LiAl_{0.4}Ge_{1.6}(PO_4)_3$ $Li_{1.4}Ti_{1.6}Y_{0.4}(PO_4)_3$ $Li_{3-2x}(Sc_{1-x}M_x)_2(PO_4)_3$ M = Zr, Ti, x = 0.1, 0.2 $Li_3Sc_{1.5}Fe_{0.5}(PO_4)_3$ | |

*denotes that components are mixed together

Table 2 below shows simulated lithium ion transport properties for various poly(ketone)-based polymers. The listed poly(ketone) polymers show excellent lithium ion transport properties. Specifically, the polydiketones (entry 1 and 2) and polytriketones (entry 4 and 5) are promising candidates for lithium ion transport applications.

TABLE 2

Lithium Transport Properties of Poly(ketone)-Based Polymers

| Entry | Polymer | Chemical Structure | LiTFSI Concentration (wt %) | κ (S/cm) | $t_+$ |
|---|---|---|---|---|---|
| 1 | Poly(1,3-nonyldiketone) | 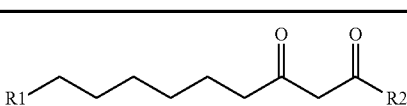 | 30 | $6.1 \times 10^{-4}$ | 0.68 |
| 2 | Poly(cis-non-6-ene-1,3-diketone) | 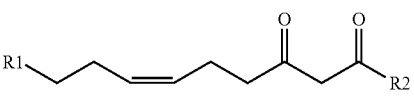 | 30 | $1.21 \times 10^{-3}$ | 0.67 |

TABLE 2-continued

Lithium Transport Properties of Poly(ketone)-Based Polymers

| Entry | Polymer | Chemical Structure | LiTFSI Concentration (wt %) | κ (S/cm) | $t_+$ |
|---|---|---|---|---|---|
| 3 | Polyhexyl-glyoxal | R1—(CH₂)₆—C(=O)—C(=O)—R2 | 30 | $8.9 \times 10^{-5}$ | 0.81 |
| 4 | Poly(nonyl-1,3,5-triketone) | R1—(CH₂)—C(=O)—CH₂—C(=O)—CH₂—C(=O)—R2 | 30 | $9.5 \times 10^{-4}$ | 0.75 |
| 5 | Poly(nonyl-1,2,3-triketone) | R1—(CH₂)—C(=O)—C(=O)—C(=O)—R2 | 30 | $1.1 \times 10^{-4}$ | 0.59 |

Ketone Group Chemical Stability

Table 3 shows ionization potentials (IP) and the energy difference between tautomers of ketone groups as simulated using quantum chemistry (QC) (method: M06-HF/aug-cc-pvtz//PBE0/aug-cc-pvtz).

TABLE 3

Ionization Potentials (IP) and Energy Differences between Tautomers of Ketone Groups

| Group | Keto-form | Enol-form | $E_{Enol} - E_{Keto}$ |
|---|---|---|---|
| Ketone | H₃C—CH₂—CH₂—C(=O)—CH₂—C(=O)—CH₂—CH₂—CH₃<br>IP = 10.75 eV | H₃C—CH₂—CH₂—C(=O)—CH=C(OH)—CH₂—CH₂—CH₃<br>IP = 9.42 eV | 0.29 eV |

Ketone Group Electrochemical Stability

Cyclic voltammetry was measured using a three-electrode system that included a Pt button working electrode, a Pt wire counter electrode, and a quasi-reference electrode constructed from an Ag wire dipped in a 10 mM AgNO₃ in 0.1 M tetrabutylammonium hexafluorophosphate solution in glass tubing with an attached Vycor frit. The quasi-reference electrode was first calibrated against a 10 mM ferrocene solution in 0.1 M lithium tetrafluoroborate (LiBF₄) in propylene carbonate, to give $E_{ox}$ (ferrocene/ferrocenium)= 0.058 V (vs. Ag/Ag⁺). Then the same ferrocene solution was used to calibrate a lithium reference electrode ($E_{ox}$ (ferrocene/ferrocenium)=3.35-3.39 V (vs. Li/Li⁺)). The cyclic voltammetry was carried out on 0.1M solution of acetyl acetone (a diketone) in 0.1M LiBF₄ in propylene carbonate and at a scan rate of 5 mV/s. The cyclic voltammetry data were then standardized for Li/Li⁺ to reflect oxidation stability in a lithium cell, as electrolyte materials made from acetyl acetone can interact with lithium electrodes in an actual battery cell. The results are shown in the graph in FIG. 1. As shown in FIG. 1, acetyl acetone had electrochemical oxidation stability up to at least 4.5 V with insignificant current density response even at 4.5 V. This clearly indicates that this type of ketone-based polymeric system is stable at high voltages and can be used as an electrolyte in high energy density lithium ion batteries.

Cell Designs that Include Ketone-Based Polymers

Figure 2:
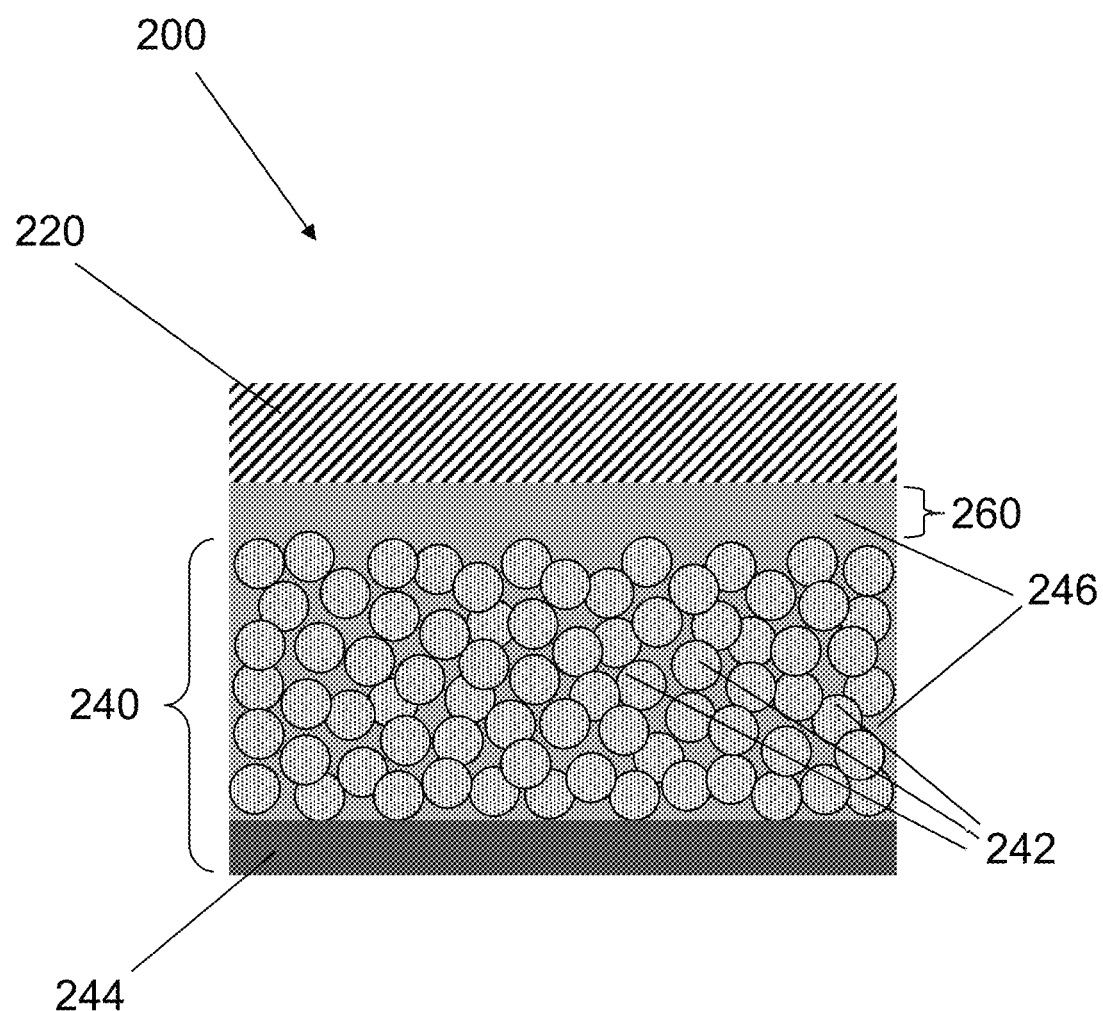
FIG. 2 is a schematic illustration of one configuration of a lithium battery cell that contains an electrolyte that is used in both the cathode and the separator, according to an embodiment of the invention.

In one embodiment of the invention, a lithium battery cell 200 has an anode 220 that is configured to absorb and release lithium ions, as shown in FIG. 2. The anode 220 may be a lithium or lithium alloy foil or it may be made of a material into which lithium ions can be absorbed such as graphite or silicon. Other choices for the anode 220 include, but are not limited to, lithium titanate, and lithium-silicon alloys. The lithium battery cell 200 also has a cathode 240 that includes cathode active material particles 242, an electronically-conductive additive such as carbon black (not shown), a current collector 244, a catholyte (electrolyte in the cathode) 246, and an optional binder (not shown). In one arrangement, the catholyte 246 includes any of the ketone-based polymer electrolytes disclosed above. In another arrangement, the catholyte 246 includes mixtures or combinations of other solid polymer electrolytes with ketone-based polymer electrolytes. There is a separator region 260 between the anode 220 and the cathode 240. The catholyte 246 extends all the way into the separator region 260 and facilitates movement of lithium ions back and forth between the anode 220 and the cathode 240 as the cell 200 cycles. The electrolyte 246 in the separator region 260 and the catholyte 246 in the cathode 240 are the same.

Figure 3:
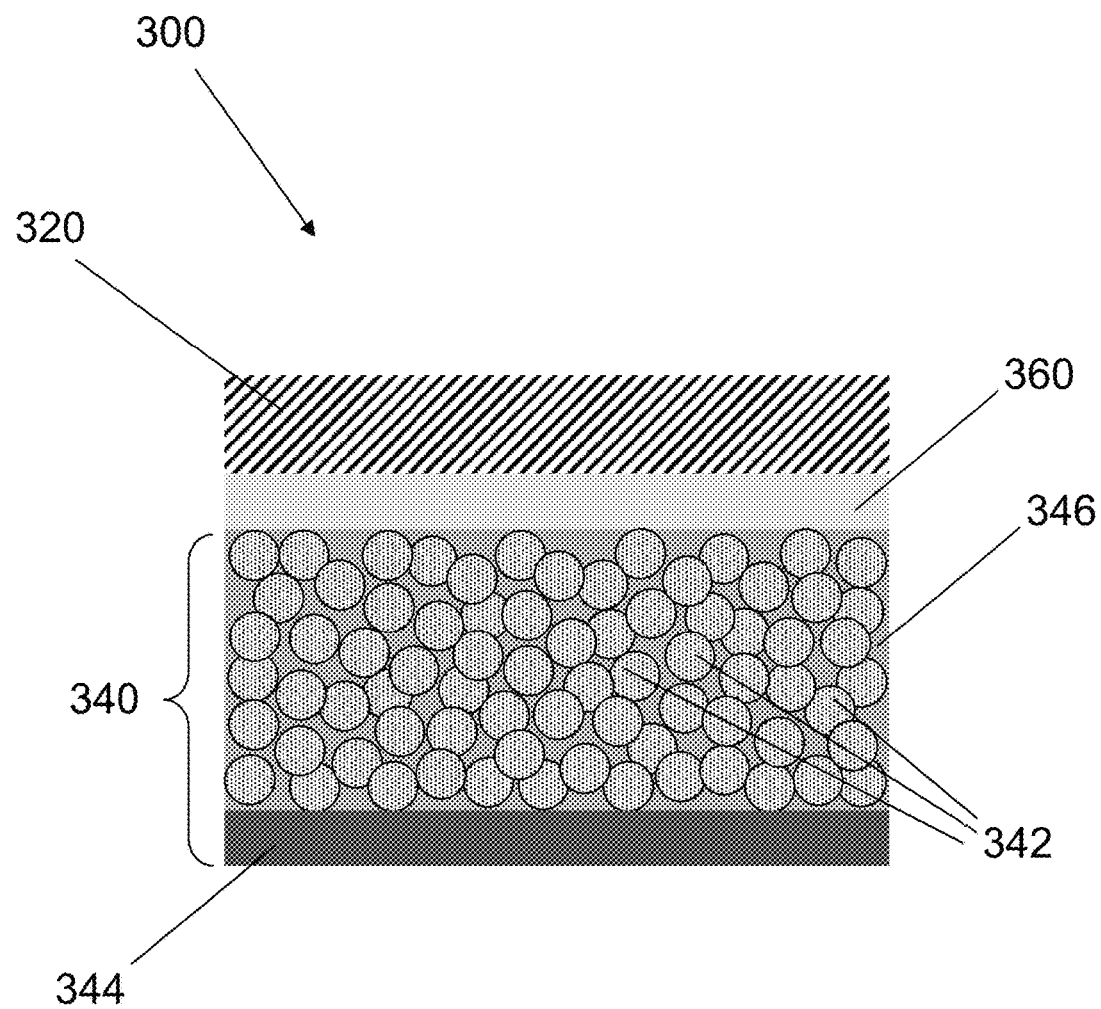
FIG. 3 is a schematic illustration of another configuration of a lithium battery cell that contains a catholyte and a separator electrolyte different from the catholyte, according to an embodiment of the invention.

In another embodiment of the invention, a lithium battery cell 300 has an anode 320 that is configured to absorb and release lithium ions as shown in FIG. 3. The anode 320 may be a lithium or lithium alloy foil or it may be made of a material into which lithium ions can be absorbed such as graphite or silicon. Other choices for the anode 320 include, but are not limited to, lithium titanate, and lithium-silicon alloys. The lithium battery cell 300 also has a cathode 340 that includes cathode active material particles 342, an electronically-conductive additive such as carbon black (not shown), a current collector 344, a catholyte 346, and an optional binder (not shown). In one arrangement, the catholyte 346 includes any of the ketone-based polymer electrolytes disclosed above. In another arrangement, the catholyte 346 includes mixtures or combinations of other solid polymer electrolytes with ketone-based polymer electrolytes. There is a separator electrolyte 360 between the anode 320 and the cathode 340. The separator electrolyte 360 facilitates movement of lithium ions back and forth between the anode 320 and the cathode 340 as the cell 300 cycles. The separator electrolyte 360 may include any electrolyte that is suitable for use in a lithium battery cell. In one arrangement, the separator electrolyte 360 contains a liquid electrolyte that is soaked into a porous plastic material (not shown). In another arrangement, the separator electrolyte 360 contains a viscous liquid or gel electrolyte. In another arrangement, the separator region 360 contains a solid polymer electrolyte in which the ketone-based polymer is immiscible.

Figure 4:
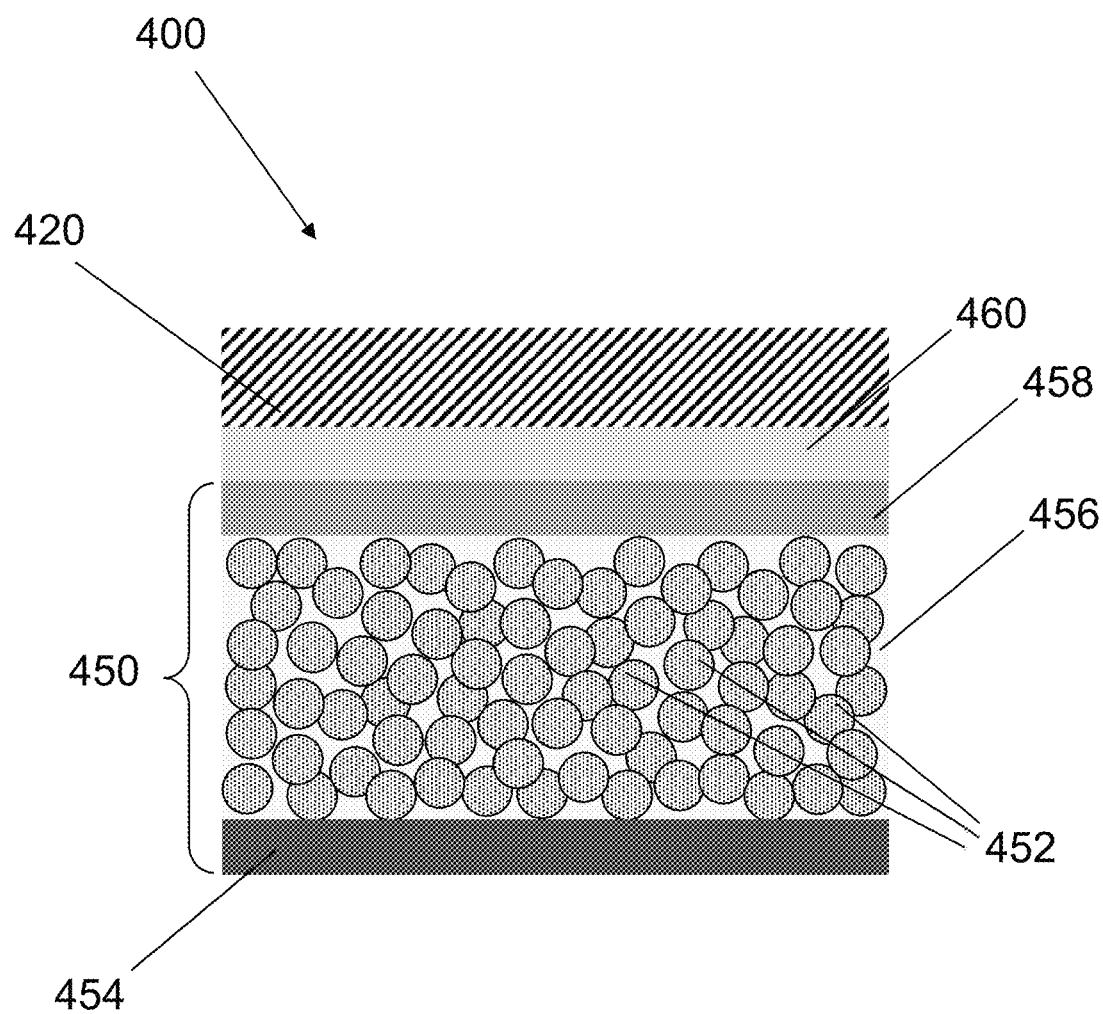
FIG. 4 is a schematic illustration of another configuration of a lithium battery cell that contains a catholyte and a cathode overcoat layer, according to an embodiment of the invention.

In another embodiment of the invention, a battery cell with a third configuration is described. With reference to FIG. 4, a lithium battery cell 400 has an anode 420 that is configured to absorb and release lithium ions. The anode 420 may be a lithium or lithium alloy foil or it may be made of a material into which lithium ions can be absorbed such as graphite or silicon. Other choices for the anode 420 include, but are not limited to, lithium titanate, and lithium-silicon alloys. The lithium battery cell 400 also has a cathode 450 that includes cathode active material particles 452, an electronically-conductive additive (not shown), a current collector 454, a catholyte 456, an optional binder (not shown), and an overcoat layer 458. In one arrangement, the electrolyte in the overcoat layer 458 and the catholyte 456 are the same. In another arrangement, the electrolyte in the overcoat layer 458 and the catholyte 456 are different. The overcoat layer 458 and/or the catholyte 456 may contain any of the ketone-based polymer electrolytes or mixtures or combinations of other solid polymer electrolytes with ketone-based polymer electrolytes or electrolyte additives (in a solid polymer electrolyte host) disclosed herein. In one arrangement, the overcoat layer 458 is a solid electrolyte layer. There is a separator region 460 between the anode 420 and the cathode 450. The separator region 460 contains an electrolyte that facilitates movement of lithium ions back and forth between the anode 420 and the cathode 450 as the cell 400 cycles. The separator region may include any electrolyte that is suitable for such use in a lithium battery cell. In one arrangement, the separator electrolyte 460 contains a liquid electrolyte that is soaked into a porous plastic material (not shown). In another arrangement, the separator electrolyte 460 contains a viscous liquid or gel electrolyte. In another arrangement, the separator region 460 contains a solid polymer electrolyte in which the ketone-based polymer is immiscible.

A solid polymer electrolyte for use in separator region, such as separator regions 360 or 460, can be any electrolyte that is appropriate for use in a Li battery. Of course, many such electrolytes also include electrolyte salt(s) that help to provide ionic conductivity. Examples of such electrolytes include, but are not limited to, block copolymers that contain ionically-conductive blocks and structural blocks that make up ionically-conductive phases and structural phases, respectively. The ionically-conductive phase may contain one or more linear polymers such as polyethers, polyamines, polyimides, polyamides, poly alkyl carbonates, polynitriles, perfluoro polyethers, fluorocarbon polymers substituted with high dielectric constant groups such as nitriles, carbonates, and sulfones, and combinations thereof. In one arrangement, the ionically-conductive phase contains one or more ketone-based polymer, as disclosed herein. The linear polymers can also be used in combination as graft copolymers with polysiloxanes, polyalkoxysiloxanes, polyphosphazines, polyolefins, and/or polydienes to form the conductive phase. The structural phase can be made of polymers such as polystyrene, hydrogenated polystyrene, polymethacrylate, poly(methyl methacrylate), polyvinylpyridine, polyvinylcyclohexane, polyimide, polyamide, polypropylene, polyolefins, poly(t-butyl vinyl ether), poly(cyclohexyl methacrylate), poly(cyclohexyl vinyl ether), poly(t-butyl vinyl ether), polyethylene, poly(phenylene oxide), poly(2,6-dimethyl-1,4-phenylene oxide), poly(phenylene sulfide), poly(phenylene sulfide sulfone), poly(phenylene sulfide ketone), poly(phenylene sulfide amide), polysulfone, fluorocarbons, such as polyvinylidene fluoride, or copolymers that contain styrene, methacrylate, or vinylpyridine. It is especially useful if the structural phase is rigid and is in a glassy or crystalline state.

With respect to the embodiments described in FIGS. 2, 3, and 4, suitable cathode active materials include, but are not limited to, LFP (lithium iron phosphate), LMP (lithium metal phosphate in which the metal can be Mn, Co, or Ni), $V_2O_5$ (divanadium pentoxide), NCA (lithium nickel cobalt aluminum oxide), NCM (lithium nickel cobalt manganese oxide), high energy NCM (HE-NCM—magnesium-rich lithium nickel cobalt manganese oxide), lithium manganese spinel, lithium nickel manganese spinel, and combinations thereof. Suitable electronically-conductive additives include, but are not limited to, carbon black, graphite, vapor-grown carbon fiber, graphene, carbon nanotubes, and combinations thereof. A binder can be used to hold together the cathode active material particles and the electronically conductive additive. Suitable binders include, but are not limited to, PVDF (polyvinylidene difluoride), PVDF-HFP poly (vinylidene fluoride-co-hexafluoropropylene), PAN (polyacrylonitrile), PAA (polyacrylic acid), PEO (polyethylene oxide), CMC (carboxymethyl cellulose), and SBR (styrene-butadiene rubber).

EXAMPLES

The following example provides details relating to fabrication of poly(ketone)-based polymers in accordance with the present invention. It should be understood the following is representative only, and that the invention is not limited by the detail set forth in this example.

In one example, a synthetic route to produce poly(nonyl-1,3-diketone), is depicted below.

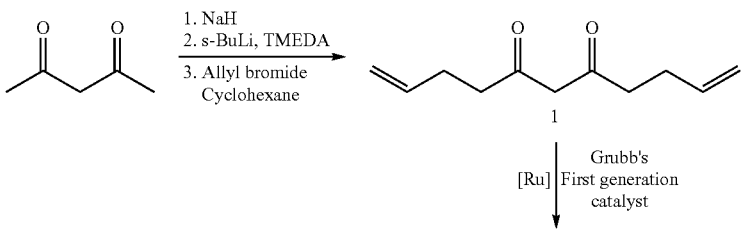

Synthesis of (1) (Diallylacetyl Acetone):

To a solution of acetyl acetone (2 g, 20 mmol) in anhydrous cyclohexane (30 mL), sodium hydride (0.958 g, 40 mmol) was added and stirred for 30 minutes at 20° C. After that, tetramethylethylenediamine (TMEDA) (5.9 mL, 40 mmol) was added to the reaction mixture followed by slow addition of sec-BuLi (30.6 mL, 40 mmol) at 0° C. The reaction was allowed to proceed at 20° C. for 24 hours. Allyl bromide (3.44 mL, 40 mmol) was then added, and the reaction was continued for another 4 hours at 20° C. The reaction was quenched by slow addition of water, and the products were extracted into ethyl acetate, which was rotavapored to obtain the crude product. The crude product was subjected to column chromatography using an ethyl acetate/hexane mixture (5:95) to obtain 1 in 1.0 g (30% yield).

Synthesis of (2):

To a solution of (1) (0.8 g, 4.4 mmol) in dichloroethane (10 mL), Grubb's 1st generation catalyst (18 mg, 0.02 mmol) was added and stirred at 60° C. under high vacuum for 16 hours. Polymer (2) was isolated as a brown viscous liquid by precipitation in methanol. The amount of polymer (2) obtained was 0.13 g (20% yield).

Synthesis of (3):

To a solution of (2) (0.5 g, 0.3 mmol) in ethyl acetate (10 mL), Pd/C (0.1 g) was added and vigorously stirred at room temperature under a positive $H_2$ pressure for 24 hours. Polymer (3) was obtained as a white powder by precipitation in methanol. The amount of polymer (3) obtained was 0.4 g (80% yield).

This invention has been described herein in considerable detail to provide those skilled in the art with information relevant to apply the novel principles and to construct and use such specialized components as are required. However, it is to be understood that the invention can be carried out by different equipment, materials and devices, and that various modifications, both as to the equipment and operating procedures, can be accomplished without departing from the scope of the invention itself.

We claim:

1. A polymer, comprising:
a ketone-based polymer structure described by:

$a$ is an integer that ranges from 1 to 10;
$b$ is an integer that ranges from 1 to 10;
$n$ is an integer that ranges from 1 to 1000;
each $Z$ and $Z_1$ is selected independently from the group consisting of:

—H, F, —$CH_3$, —$CH_2CH_3$, —$(CH_2)_2CH_3$, —$CH(CH_3)_2$,
—$(CH_2)_3CH_3$, —CH=$CH_2$, —$CH_2$CH=$CH_2$, —$CF_3$,
—$CF_2CF_3$, —$(CH_2)_c$—$OR_1$, —$(CH_2)_c$—CN, —$(CH_2)_c$—$SO_2$—$R_1$,
—$(CH_2)_c$—OPO$(OR_1)_2$, —$(CH_2)_c$—PO$(OR_1)_2$, —$(CH_2)_c$—$OCOR_1$,
—$(CH_2)_c$—$CO_2R_1$, —$(CH_2)_c$—$COR_1$, phenyl-$R_1$, cyclic carbonate;

wherein $c$ is an integer that ranges from 0 to 10;
each $R_1$ is selected independently from the group consisting of hydrogen, methyl, ethyl, propyl, and isopropyl groups; and
each $R$ is selected independently from the group consisting of:

wherein $d$, $e$, and $f$ are integers, and each integer ranges independently from 0 to 10; and
each $X$ is selected independently from the group consisting of hydrogen, fluorine, methyl, ethyl, isopropyl, and trifluoromethyl groups.

2. The polymer of claim 1 further comprising an electrolyte salt, wherein the polymer is an electrolyte.

3. The polymer of claim 2 further comprising ceramic electrolyte particles.

4. The polymer of claim 1 wherein the polymer is crosslinked.

5. The polymer of claim 4 further comprising an electrolyte salt, wherein the polymer is an electrolyte.

6. A positive electrode comprising:
a positive electrode active material; and
a catholyte comprising the electrolyte according to claim 2;
wherein the positive electrode active material particles and the catholyte are mixed together.

7. The positive electrode of claim 6 wherein the catholyte further comprises a solid polymer electrolyte.

8. The positive electrode of claim 6 wherein the catholyte further comprises ceramic electrolyte particles.

9. The positive electrode of claim 6 wherein the catholyte is crosslinked.

10. The positive electrode of claim 6 wherein the positive electrode active material is selected from the group consisting of lithium iron phosphate, lithium metal phosphate, divanadium pentoxide, lithium nickel cobalt aluminum oxide, lithium nickel cobalt manganese oxide, magnesium-rich lithium nickel cobalt manganese oxide, lithium manganese spinel, lithium nickel manganese spinel, and combinations thereof.

11. The positive electrode of claim 6 wherein the electrolyte salt is a lithium salt.

12. An electrochemical cell, comprising:
an anode configured to absorb and release lithium ions;
a cathode comprising cathode active material particles, an electronically-conductive additive, and a first catholyte;
a current collector adjacent to an outside surface of the cathode; and
a separator region between the anode and the cathode, the separator region comprising a separator electrolyte configured to facilitate movement of lithium ions back and forth between the anode and the cathode;
wherein the first catholyte comprises the electrolyte according to claim 2, and the electrolyte salt is a lithium salt.

13. The electrochemical cell of claim 12 wherein the first catholyte further comprises a solid polymer electrolyte.

14. The electrochemical cell of claim 12 wherein the first catholyte and the separator electrolyte are the same.

15. The electrochemical cell of claim 12 wherein the separator electrolyte comprises a solid polymer electrolyte.

16. The electrochemical cell of claim 12 further comprising an overcoat layer between the cathode and the separator region, the overcoat layer comprising a second catholyte, the second catholyte comprising the electrolyte according to claim 2.

17. The electrochemical cell of claim 16 wherein the first catholyte and the second catholyte are the same.

18. The electrochemical cell of claim 12 wherein the first catholyte further comprises ceramic electrolyte particles.

19. The electrochemical cell of claim 12 wherein the first catholyte is crosslinked.

20. A polymer, comprising:
a ketone-based polymer structure described by:

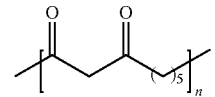

wherein n is an integer that ranges from 1 to 1000.

* * * * *